(12) United States Patent
Guo et al.

(10) Patent No.: US 12,436,663 B2
(45) Date of Patent: Oct. 7, 2025

(54) INTERFACE DISPLAY METHOD AND APPARATUS, ELECTRONIC DEVICE AND STORAGE MEDIUM

(71) Applicant: Beijing Zitiao Network Technology Co., Ltd., Beijing (CN)

(72) Inventors: Jia Guo, Beijing (CN); Chi Fang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/585,850

(22) Filed: Feb. 23, 2024

(65) Prior Publication Data

US 2024/0288994 A1    Aug. 29, 2024

(30) Foreign Application Priority Data

Feb. 23, 2023   (CN) .......................... 202310189764.9

(51) Int. Cl.

| G06F 3/01 | (2006.01) |
|---|---|
| G06F 3/0482 | (2013.01) |
| G06F 3/04842 | (2022.01) |
| G06F 3/16 | (2006.01) |

(52) U.S. Cl.
CPC ............ *G06F 3/0482* (2013.01); *G06F 3/013* (2013.01); *G06F 3/017* (2013.01); *G06F 3/04842* (2013.01); *G06F 3/167* (2013.01)

(58) Field of Classification Search
CPC ........ G06F 3/0482; G06F 3/013; G06F 3/017; G06F 3/04842; G06F 3/167; G06F 3/01; G06F 3/011; G06F 3/012
See application file for complete search history.

(56) References Cited

U.S. PATENT DOCUMENTS

| 9,823,745 | B1 * | 11/2017 | Fateh | ...................... G06T 11/206 |
| 2016/0162020 | A1 * | 6/2016 | Lehman | .................. G06F 3/017 |
| | | | | 715/835 |
| 2019/0339769 | A1 * | 11/2019 | Cox | ........................ G06F 3/016 |

FOREIGN PATENT DOCUMENTS

| CN | 106682117 A | 5/2017 |
| CN | 110174937 A | 8/2019 |

* cited by examiner

*Primary Examiner* — Stephen G Sherman
(74) *Attorney, Agent, or Firm* — BakerHostetler

(57) ABSTRACT

An embodiment of the present disclosure provides an interface display method, apparatus, device and medium. The interface display method includes: detecting an interface triggering action during a process of displaying a target image by a virtual terminal device; in response to the interface triggering action, determining a target interface that needs to be displayed; detecting a first line-of-sight position corresponding to a line-of-sight of a user in the target image; displaying the target interface at the first line-of-sight position of the target image. By detecting the user's actions and line-of-sight, the display and control of the interface are triggered to solve the problem of low efficiency of interface processing for the extended reality scenario.

20 Claims, 9 Drawing Sheets

INTERFACE DISPLAY METHOD AND APPARATUS, ELECTRONIC DEVICE AND STORAGE MEDIUM

CROSS-REFERENCE TO RELATED APPLICATION

The present disclosure claims priority of the Chinese Patent Application No. 202310189764.9, filed on Feb. 23, 2023, the entire disclosure of which is incorporated herein by reference as part of the present disclosure.

TECHNICAL FIELD

Embodiments of the present disclosure relate to the field of computer technology and particularly, to an interface display method and apparatus, an electronic device, and a storage medium.

BACKGROUND

Extended Reality (XR) refers to a virtual environment that combines real and virtual environments through computer technology to achieve human-computer interaction, which is a collective term for Augmented Reality (AR), Virtual Reality (VR), Mixed Reality (MR), and other forms, and can provide the user with immersive interaction between the virtual world and the real world.

Nowadays, in order to improve the convenience of device operation, the extended reality technology may display corresponding interactive interfaces for the user, such as shortcut menus, various types of messages or notifications displayed in the form of pop-up windows. However, at present, shortcut menus and pop-up windows are generally displayed as simple prompts at the top of the display screen. When the user uses the XR device, it is difficult to process interfaces such as shortcut menus and pop-up windows, and the interface processing efficiency is low.

SUMMARY

Embodiments of the present disclosure provide an interface display method and apparatus, device, medium, and program product for extended reality to solve the problem of low efficiency of interface processing for the extended reality scenario.

A first aspect, at least one embodiment of the present disclosure provides an interface display method, the interface display method includes:
  detecting an interface triggering action during a process of displaying a target image by a virtual terminal device;
  in response to the interface triggering action, determining a target interface that needs to be displayed;
  detecting a first line-of-sight position corresponding to a line-of-sight of a user in the target image;
  displaying the target interface at the first line-of-sight position of the target image.

A second aspect, at least one embodiment of the present disclosure provides an interface display apparatus, the interface display apparatus includes:
  an action detection unit, configured to detect an interface triggering action during a process of displaying a target image by a virtual terminal device;
  an interface determination unit, configured to determine a target interface that needs to be displayed in response to the interface triggering action;
  a position detection unit, configured to detect a first line-of-sight position corresponding to a line-of-sight of a user in the target image;
  an interface display unit, configured to display the target interface at the first line-of-sight position of the target image A third aspect, at least one embodiment of the present disclosure provides an electronic device, the electronic device includes: a processor, and a memory, the memory stores computer execution instructions, the processor executes the computer-executed instructions stored in the memory, causing the processor implements the interface display method of the first aspect and various possible designs as described above.

A fourth aspect, at least one embodiment of the present disclosure provides a non-transitory computer-readable storage medium, the non-transitory computer-readable storage medium stores computer-executable instructions, upon the processor executing the computer-executable instructions, the interface display method of the first aspect and various possible designs as described above is implemented.

A fifth aspect, at least one embodiment of the present disclosure provides a computer program product, the computer program product includes computer programs, when the computer programs are executed by a processor, the interface display method of the above first aspect and various possible designs of the first aspect is implemented.

In the technical solution provided by embodiments of the present disclosure, an interface triggering action may be received during a process of displaying a target image by a virtual terminal device. In response to the interface triggering action, a target interface to be displayed may be determined, so that after detecting a first line-of-sight position corresponding to the line-of-sight of the user in the target image, the target interface may be displayed in association with the first line-of-sight position of the target image. Because the target interface is displayed at the first line-of-sight position, the user may be enabled to view the target interface in a timely manner. Through the associated display of the target interface and the first line-of-sight position, efficient viewing prompts can be provided for the target interface, thereby improving the viewing efficiency of the target interface. At the same time, by detecting the first line-of-sight position of the user, real-time detection of the line-of-sight of the user can be achieved, and by analyzing the position of line-of-sight of the user, a quick response to the viewing behavior of the user can be achieved, so as to achieve the purpose of accurate and efficient interaction with the user.

BRIEF DESCRIPTION OF DRAWINGS

In order to more clearly explain the embodiments of the present disclosure or the technical solutions in the prior art, the drawings needed in the description of the embodiments or the prior art will be briefly introduced below. Obviously, the drawings in the following description are some embodiments of the present disclosure, and for ordinary people in the field, other drawings can be obtained according to these drawings without paying creative labor.

DETAILED DESCRIPTION

Figure 1:
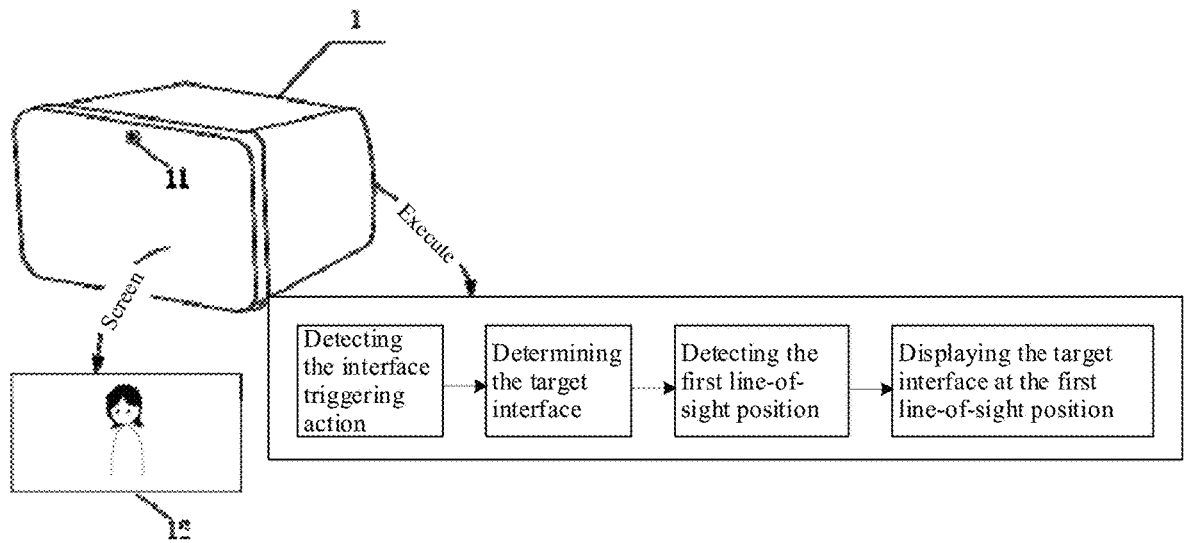
FIG. 1 is an application network architecture diagram of an interface display method according to the present disclosure.

In order to make the purpose, technical scheme and advantages of the embodiment of the present disclosure more clear, the technical scheme in the embodiment of the present disclosure will be described clearly and completely with the attached drawings. Obviously, the described embodiment is a part of the embodiment of the present disclosure, but not the whole embodiment. Based on the embodiments in this disclosure, all other embodiments obtained by ordinary technicians in this field without creative work belong to the scope of protection in this disclosure.

The technical solutions of the present disclosure may be applied in an XR device to associate a target interface to be displayed at a position of line-of-sight of the user by detecting the position of line-of-sight of the user in the user's XR device. By associating the interface with the position of line-of-sight of the user to be displayed, the user is made to view the target interface at the first time, and accurate and fast prompting of the target interface is achieved.

In related technology, a virtual terminal device, such as an AR device, a VR device, and the like, may display interactive content of a real user posture and a virtual user posture for the user. In addition to displaying a target image in the display screen of the virtual terminal device, an interactive interface, such as a shortcut menu and a message notification pop-up window, may also be displayed on the upper layer of the target image. However, at present, when the virtual terminal device displays a pop-up window, it is generally displayed at a fixed position, such as displaying the pop-up window at the top of the display screen. However, the display of the interface such as the pop-up window is generally random, and if the user does not pay attention to the displayed interface in time, there may be omissions, resulting in a less efficient view of the interface. In addition, for some displayed interfaces, in order to realize the interaction between the user and the interface, devices such as a handle and a bracelet may be used to detect the hand movement posture of the user, which is a relatively single interaction method, and the efficiency of the interaction between the user and the interface is low.

In order to solve the above technical problem, the inventor considers that in the application scenario of the virtual terminal device, the line-of-sight of the user is constantly changing. And in practical application, the line-of-sight of the user may be constantly detected, for example, the position point of line-of-sight of the user may be acquired. When displaying the position point of line-of-sight in the virtual terminal device, the interface to be displayed may be displayed at the position of line-of-sight, so as to realize that the user can view the target interface at the first time. By displaying the target interface, the purpose of improving the interface display efficiency and viewing efficiency can be achieved.

In embodiments of the present disclosure, an interface triggering action may be received during a process of displaying a target image by a virtual terminal device. In response to the interface triggering action, a target interface to be displayed may be determined, so that after detecting a first line-of-sight position corresponding to the line-of-sight of the user in the target image, the target interface may be displayed associated with the first line-of-sight position of the target image. Because the target interface is displayed at the first line-of-sight position, the user may be enabled to view the target interface in a timely manner. Through the associated display of the target interface and the first line-of-sight position, efficient viewing prompts can be provided for the target interface, thereby improving the viewing efficiency of the target interface. At the same time, by detecting the first line-of-sight position of the user, real-time detection of the line-of-sight of the user can be achieved, and by analyzing the position of line-of-sight of the user, a quick response to the viewing behavior of the user can be achieved, so as to achieve the purpose of accurate and efficient interaction with the user.

The technical solutions of the present disclosure and how the technical solutions of the present disclosure solve the above technical problems will be described in detail in the following specific embodiments. The following several specific embodiments may be combined with each other, and the same or similar concepts or processes may not be repeated in some embodiments. Embodiments of the present disclosure will be described in detail below in conjunction with the accompanying drawings.

FIG. 1 is an application network architecture diagram of an interface display method according to the present disclosure. The application network architecture according to an embodiment of the present disclosure may include a virtual terminal device 1, the device body of the virtual terminal device 1 includes a camera 11 and a display screen (not shown in the virtual terminal device). When a user wears the virtual terminal device, a display interface of the display screen is opposite to the user's eyes, so that the user's eyes can view an interface output from the display screen. Assuming, for ease of understanding, that an example display screen of the virtual terminal device is 12, the virtual terminal device may display a target image via the display screen 12. The target image may include a user posture image collected by a camera. During the process of displaying the target image by the virtual terminal device, an interface triggering action may be detected.

Afterwards, a target interface to be displayed may be determined in response to the interface triggering action. The line-of-sight of the user is detected at a first line-of-sight position of the target image to display the target interface associated with the first line-of-sight position of the target image. During the process of displaying the target interface, the user's first line-of-sight position is introduced to display the target interface associated with the first line-of-sight position of the target image.

Figure 2:
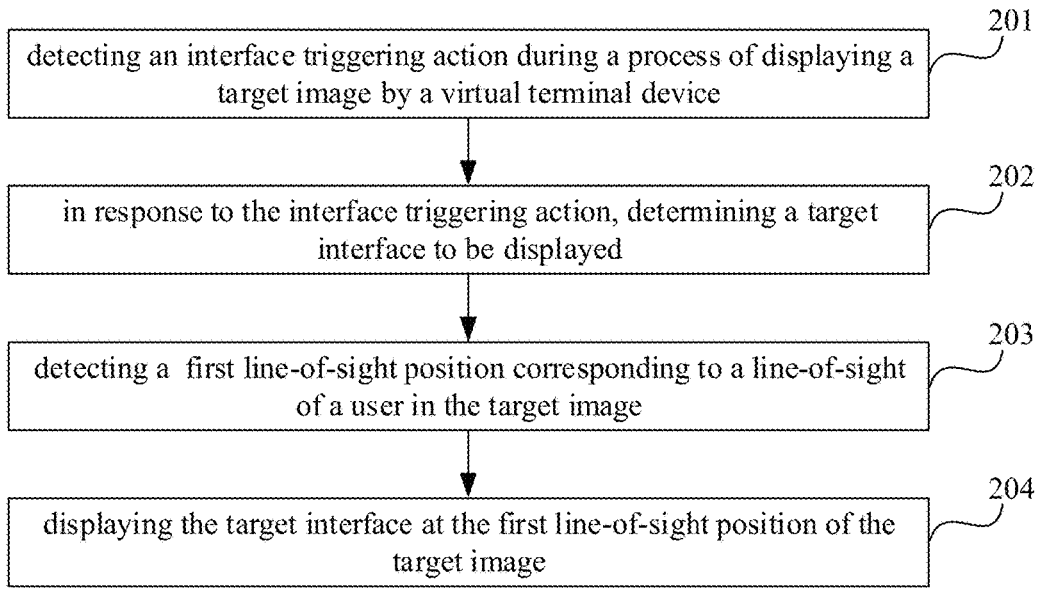
FIG. 2 is a flowchart of an interface display method provided by embodiments of the present disclosure.

Referring to FIG. 2, FIG. 2 is a flowchart of an interface display method provided by embodiments of the present disclosure, the method may include the following steps:

201: detecting an interface triggering action during a process of displaying a target image by a virtual terminal device.

Optionally, the virtual terminal device may be a wearable device, such as an XR (Extended Reality) device, which refers to a human-computer interactable device that may be created by combining the real and the virtual through a computer, and the XR device may, for example, include a VR (Virtual Reality) device, an AR (Augmented) device, an MR (Mixed Reality) device, and the like.

Optionally, the target image may include a real environment image and/or a virtual image, and may also include an overlay of the real environment image and the virtual image. In a possible design, a camera may be configured on the front side of the virtual terminal device, and the camera may perform real-world image collection of the virtual terminal device directly in front of the virtual terminal device, and display the collected real-world image in real time in the virtual terminal device.

Optionally, the target image may be an ordinary scene image, such as a scene image collected in real time by the camera, and may also include an animation image established by technical means such as animation and special effects, and may also include a content image produced by means of film or television production.

It should be noted that the specific content and type of the target image are not overly limited in the present disclosure.

Optionally, the interface triggering action may include the virtual terminal device detecting the user performing a target action that satisfies the interface triggering condition, and the target action may be an action defined for triggering the interface display. In practical application, the interface triggering condition may include the condition to be satisfied for triggering the interface display. The interface triggering action may be, for example, "focusing on a certain position for 30 seconds" or a specific gesture posture.

Optionally, the interface triggering action may also be generated by the user performing a control operation with the handle of the virtual terminal device.

202: in response to the interface triggering action, determining a target interface to be displayed.

Optionally, in practical application, the interface triggering action may include one or more, and the interface triggering action may be performed by one or more body parts. For example, the interface triggering action may be indicated by an eye action, a hand action, and the like. The interface triggering action may also be executed by a trigger switch of the virtual terminal device, i.e., the virtual terminal device may be configured with a switch such as a handle, and detecting that a user triggers the handle switch, the interface triggering action is determined to be received.

In a possible design, the target interface may directly establish a display association with the interface triggering action, i.e., step 202 may specifically include: acquiring a target interface associated with the interface triggering action. For example, if the interface triggering action is to focus on a certain position for more than 30 seconds, a relevant message interface or notification control associated with the interface triggering action may be determined.

203: detecting a first line-of-sight position corresponding to a line-of-sight of a user in the target image.

Figure 3:
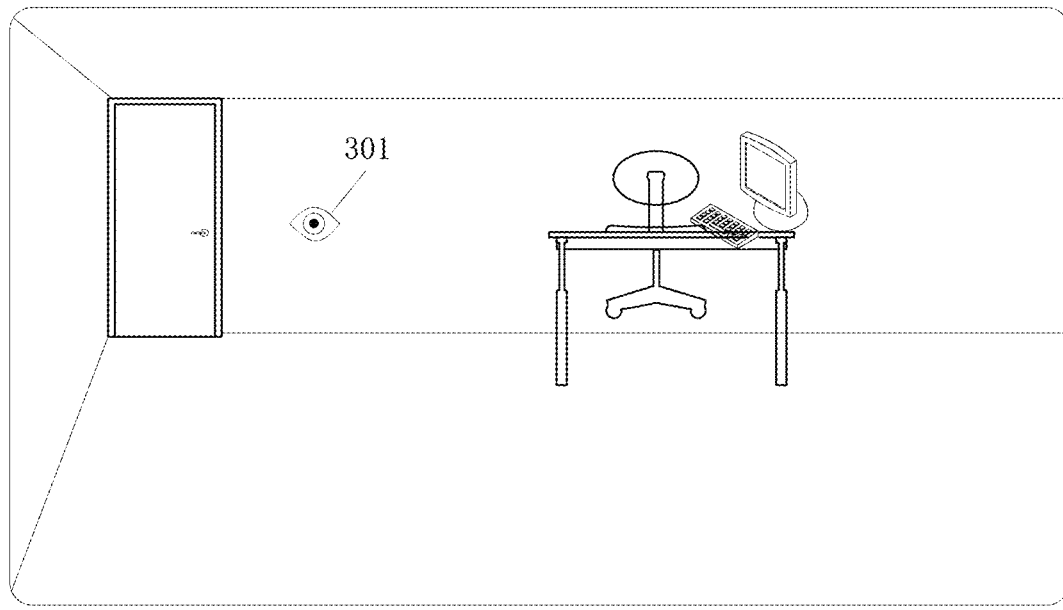
FIG. 3 is a schematic diagram of a line-of-sight prompting sign provided by embodiments of the present disclosure.

Optionally, after detecting the first line-of-sight position corresponding to the line-of-sight of the user in the target image, a line-of-sight prompting sign may be displayed at the first line-of-sight position corresponding to the target image to prompt the position of the line-of-sight by the sign. The line-of-sight prompting sign may be of any shape, for example, it may be a circular control or an eye-shaped control. For ease of understanding, FIG. 3 illustrates a schematic diagram of a line-of-sight prompting sign, and with reference to FIG. 3, the line-of-sight prompting sign 301 may be used to indicate the position of the line-of-sight. In order for the line-of-sight prompting sign to achieve accurate prompting of the position of line-of-sight, the line-of-sight prompting sign 301 is an eye-shaped sign, which can provide more intuitive prompting of the position of line-of-sight and improve the efficiency of the position prompting. Of course, the line-of-sight prompting sign may also be other shapes or types of signs, for example, it may be a sign that is set in the shape of a point and the like.

The first line-of-sight position may be a position of line-of-sight of the user at the target image. A line-of-sight sensor, such as an eye-tracker, may be configured in the virtual terminal device to detect the position of line-of-sight at the target image by the line-of-sight sensor. In order to reduce the cost of the device, the position of line-of-sight of the user may also be acquired by deep learning. For example, an ordinary camera may be used to collect a face image of the user, process the input face image through a face detection module, a deep learning algorithm such as a deep neural network, obtain the face orientation and/or the eye orientation, and determine the position of line-of-sight through the parameters such as the face orientation and/or the eye orientation, and the distance between the human eye and the screen, and the detection of the position of line-of-sight can be accomplished quickly and accurately through the deep learning algorithm.

In the embodiment, the order of detecting the first line-of-sight position corresponding to the line-of-sight of the user and detecting the interface triggering action is not limited, and may be performed simultaneously or sequentially, and the sequence can be reversed.

204: displaying the target interface at the first line-of-sight position of the target image.

Optionally, the target image may be continuously displayed, with the target image being continuously switched. After detecting the first line-of-sight position, a target interface may be displayed associated with the first line-of-sight position of the target image. The target interface may be a defined system program interface, which may include a shortcut menu interface, a push message notification interface, a webpage interface, and other common user interfaces.

Figure 4:
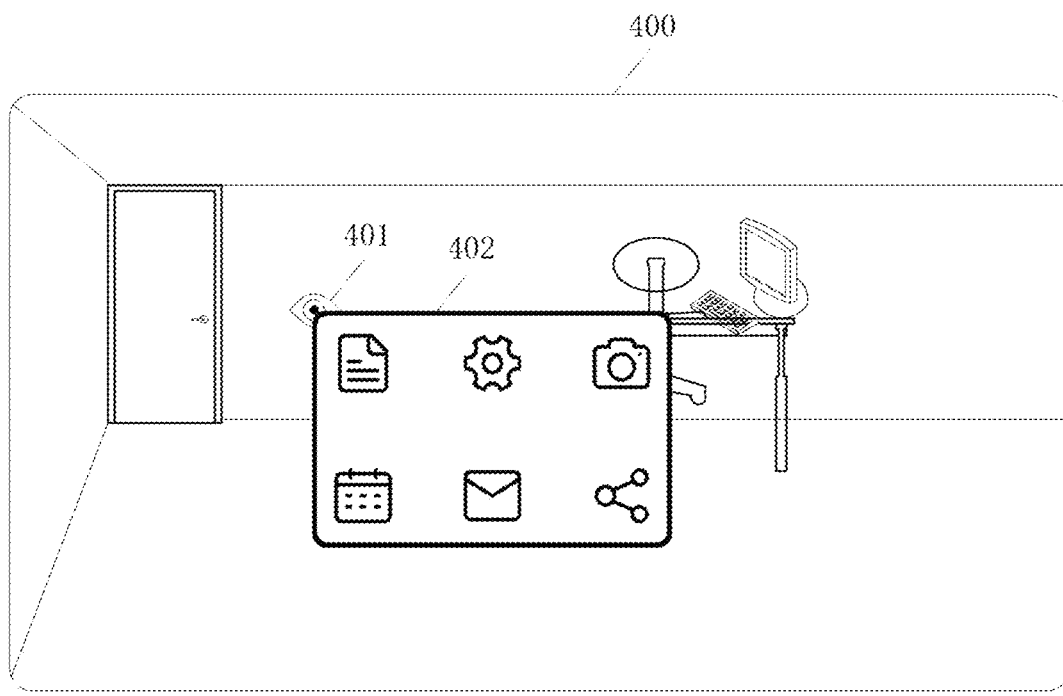
FIG. 4 is a schematic diagram of a shortcut menu interface provided by embodiments of the present disclosure.
Figure 5:
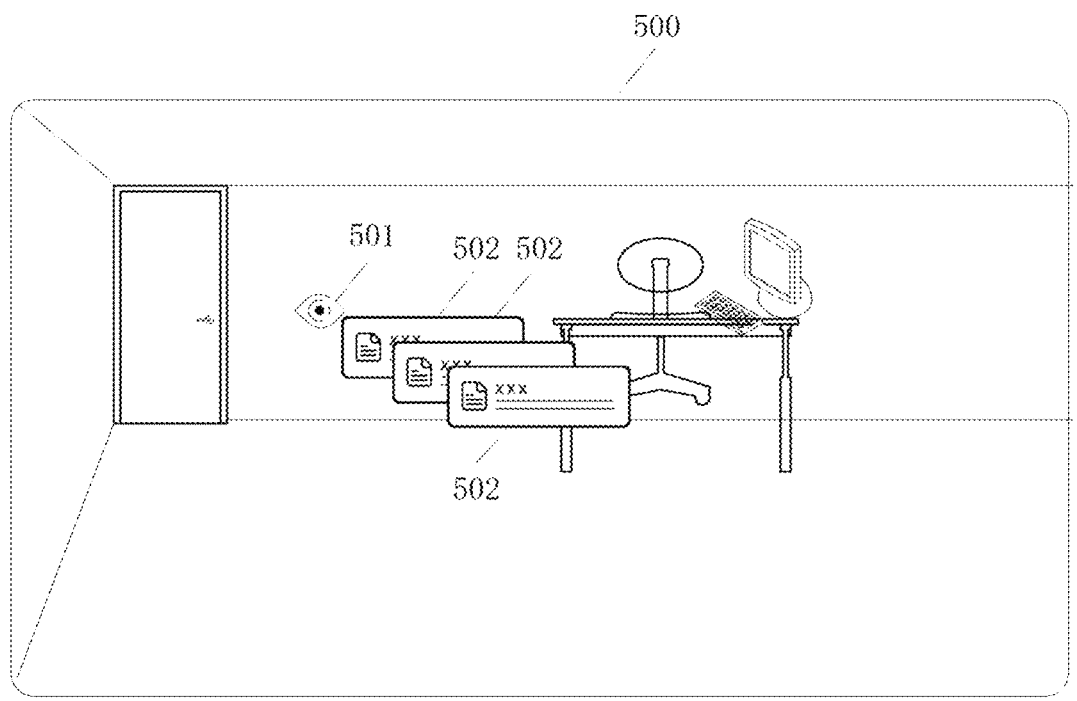
FIG. 5 is a schematic diagram of a message notification interface provided by embodiments of the present disclosure.

For ease of understanding, FIG. 4 illustrates a schematic diagram of a shortcut menu interface, and with reference to FIG. 4, a shortcut menu interface 402 may be displayed in association with a line-of-sight prompting sign 401 in the target image 400, the shortcut menu interface 402 may be displayed on an upper layer of the target image 400. The target interface may also be displayed in the form of a pop-up window. FIG. 5 illustrates a schematic diagram of a message notification interface, and with reference to FIG. 5, a plurality of message notification interfaces 502 may be displayed associated with the line-of-sight prompting sign 501 in the target image 500, the plurality of message notification interfaces 502 may overlap, and the plurality of message notification interfaces 502 may be displayed at an upper layer of the target image 500, and specifically may be displayed in the form of a message pop-up window. Of course, in practical application, the target interface may include one or more. As illustrated in FIG. 5, a plurality of message notification pop-up windows may be displayed simultaneously. When displaying the target interface, the display of the line-of-sight prompting sign may be stopped.

Optionally, displaying the target interface associated with the first line-of-sight position of the target image may specifically include: associating any point in the target interface with the first line-of-sight position to display the target interface at the first line-of-sight position in the target image. As illustrated in FIG. 4, a coordinate point in the upper left corner of the target interface may be associated with the first line-of-sight position to display the target interface at the first line-of-sight position in the target image. Of course, the target interface may be displayed at any angle or direction, and the display angle and direction of the target interface are not overly limited in this embodiment.

In embodiments of the present disclosure, an interface triggering action may be received during a process of displaying a target image by a virtual terminal device. In response to the interface triggering action, a target interface to be displayed may be determined, so that after detecting a first line-of-sight position corresponding to the line-of-sight of the user in the target image, the target interface may be displayed at the first line-of-sight position of the target image. Because the target interface is displayed at the first line-of-sight position, the user may be enabled to view the target interface in a timely manner. Through the associated display of the target interface and the first line-of-sight position, efficient viewing prompts can be provided for the target interface, thereby improving the viewing efficiency of the target interface. At the same time, by detecting the first line-of-sight position of the user, real-time detection of the line-of-sight of the user can be achieved, and by analyzing the position of line-of-sight of the user, a quick response to the viewing behavior of the user can be achieved, so as to achieve the purpose of accurate and efficient interaction with the user.

Figure 6:
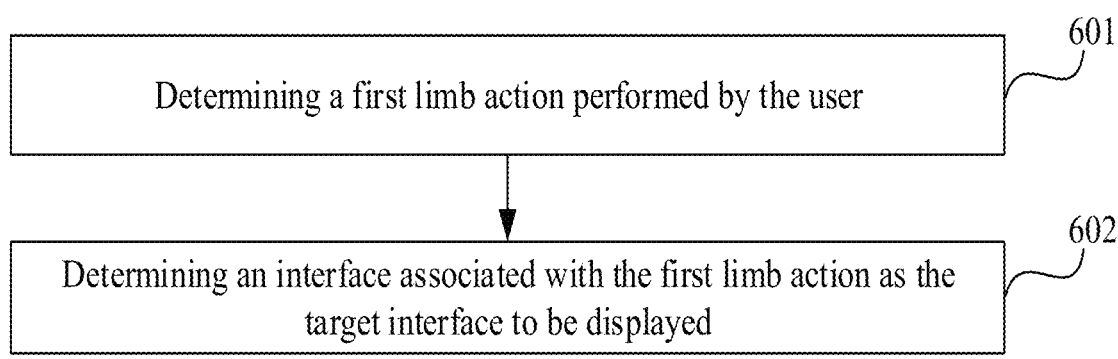
FIG. 6 is another flowchart of an interface display method provided by embodiments of the present disclosure.

Further, on the basis of any of the foregoing embodiments, in response to the interface triggering action, a limb action performed by the user may be determined, and a target interface to be displayed associated with the limb action may be determined. FIG. 6 is another flowchart of an interface display method provided by an embodiment of the present disclosure, differing from the foregoing embodiment in that determining the target interface to be displayed, includes:

601: determining a first limb action performed by the user.
602: determining an interface associated with the first limb action as the target interface to be displayed.

The step 601 may include: when the interface triggering action is determined to be the first limb action, determining the interface associated with the first limb action as the target interface to be displayed.

Optionally, the step 601 may further include: after determining that the interface triggering action is detected, re-executing the user limb action detection to obtain the first limb action. Specifically, the virtual terminal device may continuously collect the target image and display the collected target image. During the process of detecting the interface triggering action, the target image is being continuously updated, and in the process of determining the target interface to be displayed, the first limb action performed by the user may be detected from the newly collected target image.

The first limb action may be a defined type of action and may include actions performed by various body parts, such as a hand action, an eye action, and the like.

In embodiments of the present disclosure, by detecting the first limb action performed by the user, the interface associated with the first limb action may be determined to be the target interface to be displayed, i.e., to establish a display association between the first limb action of the user and the interface, so as to realize triggering of the interface using the limb action, and to improve the triggering efficiency and accuracy of the interface.

In addition, in order to improve the collection efficiency of the limb action of the user, the action of the user may also be collected with the aid of a wearable device of a different type from the virtual terminal device, such as a posture acquisition device.

Further, on the basis of the above embodiment, determining the first limb action performed by the user includes:
acquiring a user posture image currently collected by the virtual terminal device;
recognizing the first limb action performed by the user from the currently collected user posture image; or
acquiring first posture data collected by a posture acquisition device to recognize the first limb action performed by the user based on the first posture data, the posture acquisition device being associated with the virtual terminal device.

Optionally, after the virtual terminal device collects the user posture image, the collected user posture image may be displayed in real time.

In the embodiments of the present disclosure, the recognition of the limb action may be achieved by the user posture image, or the recognition of the limb action may be achieved by the posture data. Recognition of limb action through user posture images achieves detection of limb action from the direction of computer vision, and accurate limb action can be obtained. Accurate detection of the limb action from the direction of posture solving is achieved through recognition of the limb action by the posture data, and more accurate limb action can be obtained.

Further, optionally, the target image may include a user posture image collected by the virtual terminal device in real time. After acquiring the currently collected user posture image of the virtual terminal device, the currently collected user posture image may be displayed.

Optionally, a first limb action in the currently collected user posture image may be recognized by an action recognition algorithm. The action recognition algorithm may be an action classification algorithm obtained through training, and the specific training method of the action recognition algorithm are not be discussed herein.

Further, optionally, the step of recognizing the first limb action may include: extracting key limb information of the user from at least one first image frame of the currently collected user posture image, respectively; and determining a first limb action performed by the user based on the key limb information corresponding to the at least one first image frame, respectively. The key limb information may include a position of the key limb information, a type of action, a limb name, and other information.

Optionally, the step of recognizing the limb action of the first posture data may specifically include: solving the movement posture of the user using a posture solving algorithm to obtain the first limb action performed by the user. The posture data may be represented using parameters such as acceleration, heading angle, etc., and the limb action corresponding to the posture data may be obtained by the posture solving.

The posture acquisition device may be a hand external electronic device connected to the virtual terminal device, and may also include an eye posture acquisition device for collecting eye posture provided inside the virtual terminal device. Of course, the posture acquisition device is not limited thereto, and the posture acquisition device may also include a camera provided inside the virtual terminal device, the camera is used to collect the eye posture. The posture acquisition device may further include a camera provided outside the virtual terminal device, and the camera is used to collect various gesture actions/limb actions of the user, and judge whether the collected action is an interface triggering action or a predefined first limb action or a second limb action.

Posture data of the user's hand may be collected by the hand external electronic device, and the hand external electronic device may include, for example, a posture sensor, a handle, a bracelet, and other devices provided in the hand. The user posture data may include hand posture data, and the hand posture data may be used to record a movement posture of the hand.

The posture data of the user's eye may be collected by an eye posture acquisition device, and the eye posture acquisition device may include, for example, a camera, a vision sensor, and other devices. The user posture data may include eye posture data, and the eye posture data may be used to record the movement posture of the eye.

The movement posture of the hand or the eye may be used to solve a specific movement posture such as a movement trajectory, a movement direction, etc., of the hand or the eye. The movement posture may be represented using parameters such as acceleration, roll angle, pitch angle, heading angle, and the like.

Further, on the basis of any of the above embodiments, the first type of action includes a target hand action (e.g., a wrist flip, an OK gesture) or a target eye action, and the interface associated with the first limb action is determined to be the target interface to be displayed, including:

determining an interface associated with the target hand action or the target eye action as the target interface to be displayed.

The target interface may include a menu interface or a message notification interface. The target interface may be displayed in the wrist region, so that the display of the target interface is not affected by the hand action, improving the display effectiveness of the interface, and avoiding the impact of the display of the target interface on the hand action, improving the effectiveness and efficiency of the recognition of the hand action. The target interface may also be displayed at a position of line-of-sight, and by positioning the target interface at the position of line-of-sight, a direct display of the target interface may be realized, so that the user may view the displayed target interface at the first time, improving the display effectiveness of the target interface, and contributing to enhancing the user experience.

Optionally, the target hand action may include: a hand flip action, performing a specific action in accordance with a gesture, such as an OK action. The target eye action may include blinking, focus on a certain position for longer than a duration threshold, etc.

Optionally, detecting the first limb action performed by the user may include: initiating detection of the first limb action performed by the user when it is determined that the limb action detection condition is satisfied. The limb action detection condition may include: first determining that the limb action detection condition is satisfied when the line-of-sight of the user is moved to the hand position and the line-of-sight focus duration reaches the duration threshold.

Figure 7:
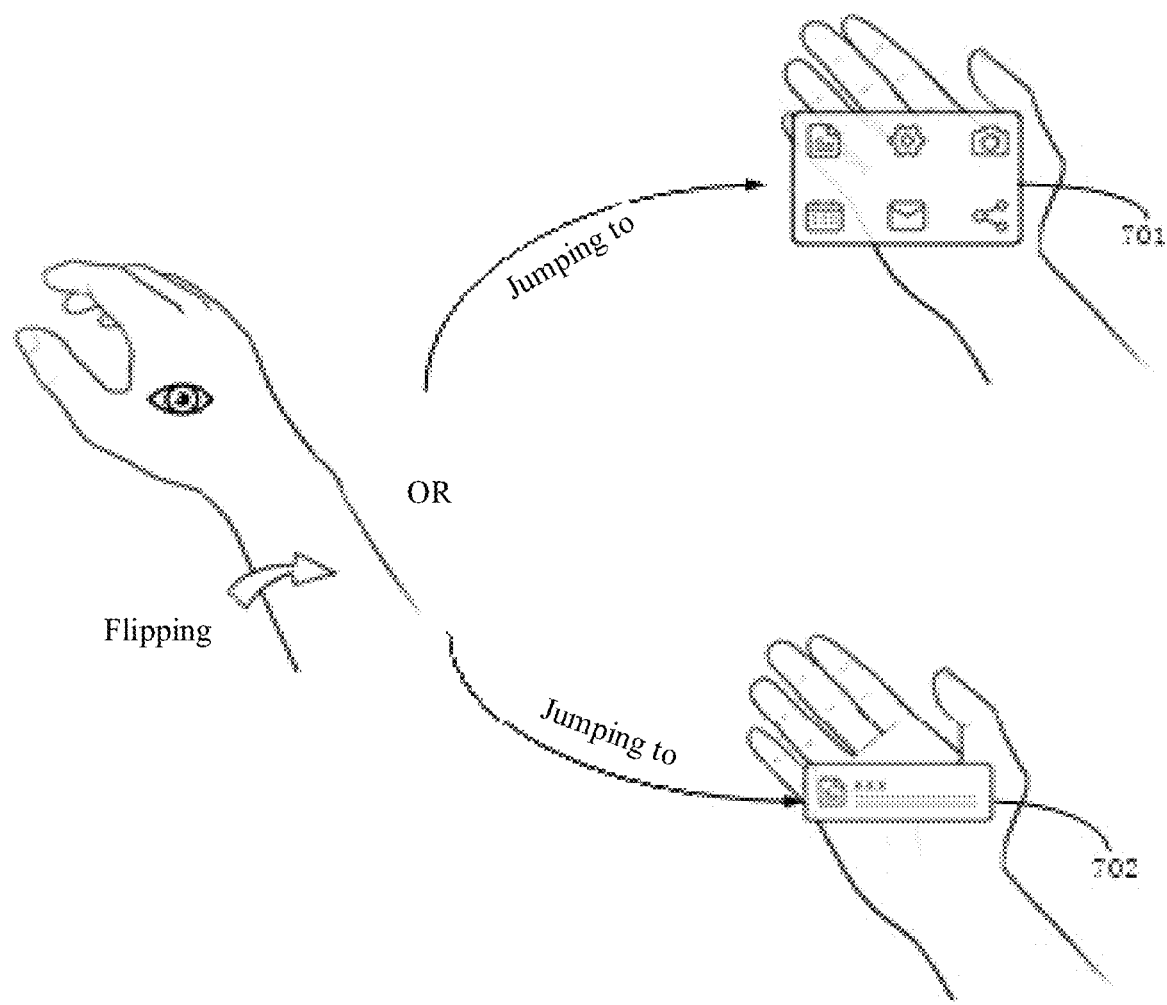
FIG. 7 is a schematic diagram of a hand flipping action provided by embodiments of the present disclosure.

For ease of understanding, taking the first limb action as a hand flipping action as an example, FIG. 7 illustrates a schematic diagram of a hand flipping action, the user's hand is detected to perform a flipping action, which specifically may be that the hand is flipped from the back of the hand to the palm of the hand, after which a menu interface 701 or a message pop-up window 702 associated with the hand flipping action may be displayed. Of course, the menu interface is only exemplary and should not constitute a detailed limitation of the interface of the present disclosure.

Figure 8:
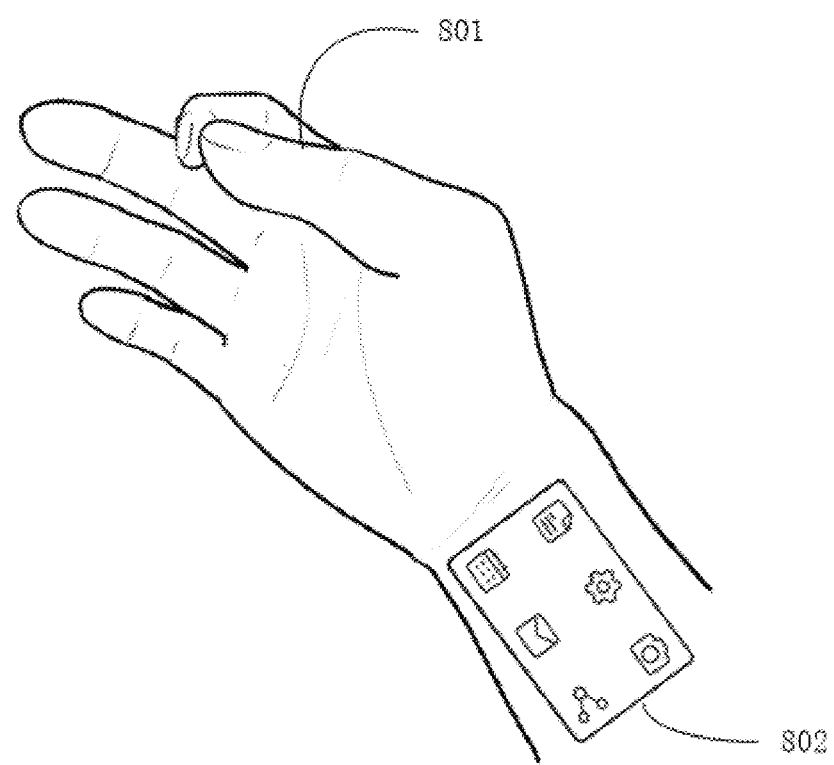
FIG. 8 is a schematic diagram of a hand-specific action provided by embodiments of the present disclosure.
Figure 9:
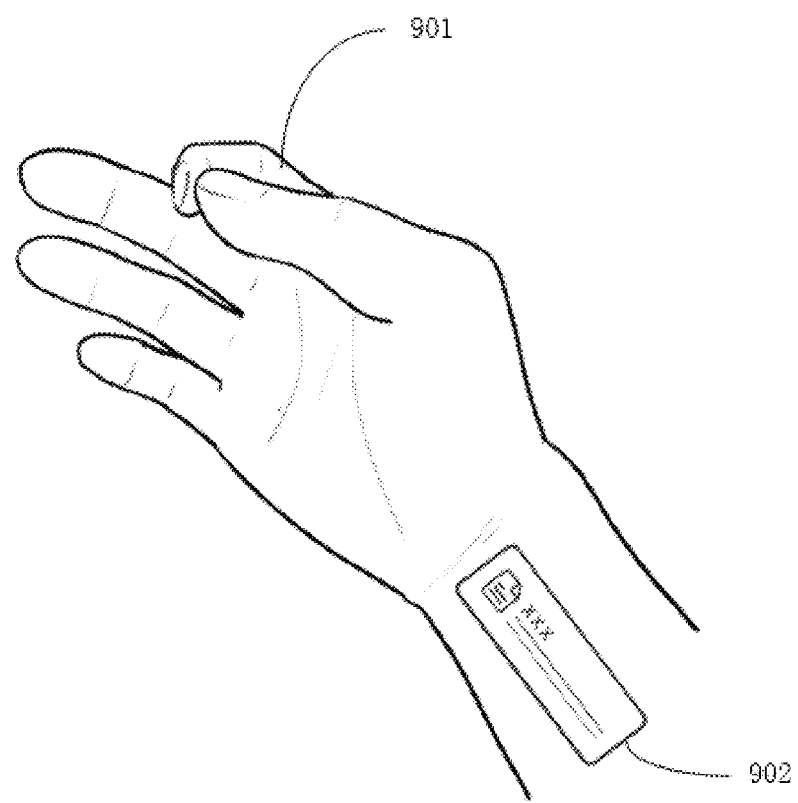
FIG. 9 is another schematic diagram of a hand-specific action provided by embodiments of the present disclosure.

Taking the first limb action as a hand performing a specific action as an example, assuming that the specific action is an OK gesture, FIG. 8 illustrates a schematic diagram of a hand-specific action, and the menu interface 802 may be displayed when the user is detected to execute the OK hand gesture action 801. Alternatively, as in a schematic diagram of a hand-specific action illustrated in FIG. 9, the message pop-up window 902 may be displayed when the user is detected to execute the OK hand gesture action 901.

Figure 10:
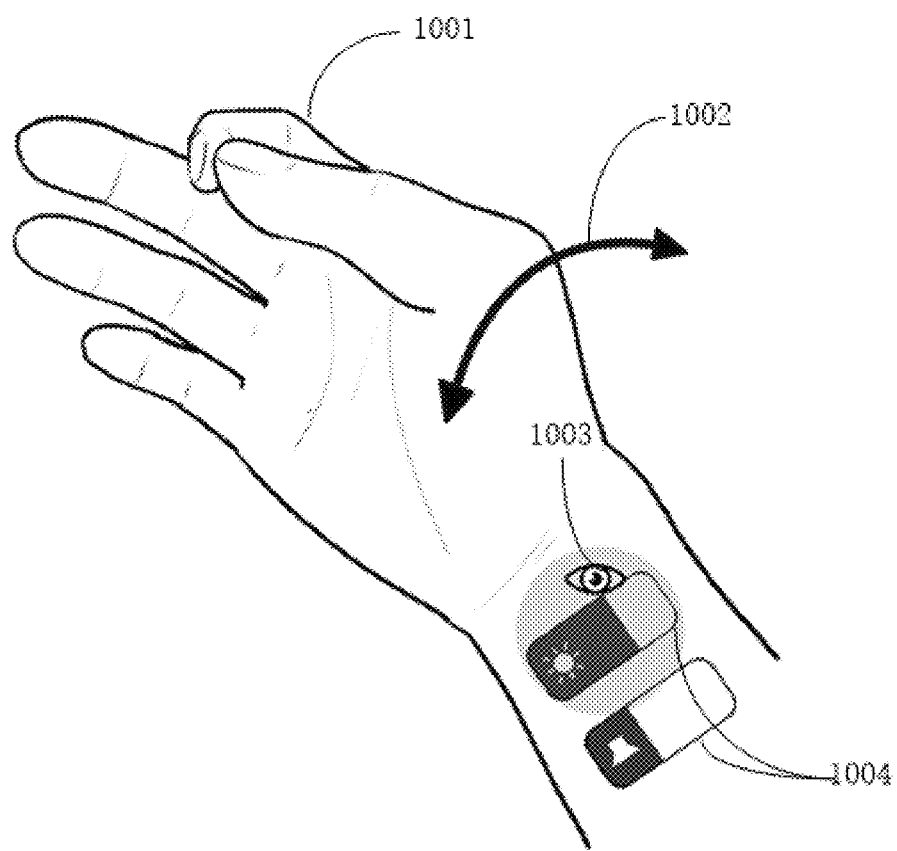
FIG. 10 is yet another schematic diagram of a hand-specific action provided by embodiments of the present disclosure.

Of course, in practical application, the specific action performed by the hand may also include at least one of a fixed action and a dynamic action of the hand. Taking the hand specific action formed by combining the two types of fixed and dynamic actions of the hand as an example, referring to the example diagram of the hand specific action shown in FIG. 10, when the user is detected to perform the OK hand gesture action 1001 and to maintain the action to perform the left-right movement 1002, the target interface 1004 formed by the device operation controls such as the brightness adjustment, the sound adjustment, etc., may be displayed at the position of line-of-sight of the user 1003. Of course, the menu interface is only exemplary and should not constitute a detailed limitation on the interface of the present disclosure. The left-right movement may include a left-right translational movement performed in a planar direction or a left-right flipping movement performed in a spatial three-dimensional angle, and the like.

In the embodiments of the present disclosure, the hand display control of the menu interface or the message notification interface can be realized by the target hand action or the target eye action, so as to improve the interface control efficiency and display efficiency. In addition, because the hand action is more flexible, rapid control of the interface can be achieved.

Further, optionally, after displaying the target interface, the method may further include: determining an interface prompting instruction, sending the interface prompting instruction to a display prompting device connected to the virtual terminal device, the interface prompting instruction being used to instruct the display prompting device to vibrate to prompt the user to view the target interface. The display prompting device may, for example, include a wearable device such as a finger ring or a bracelet that has a communication connection with the virtual terminal device. In addition, the display prompting device may be set in a vibration component in the virtual terminal device. The display prompting device may be set to prompt the displayed target interface, remind the user to view it in time, improve the user interaction experience, and achieve more three-dimensional interaction control.

Figure 11:
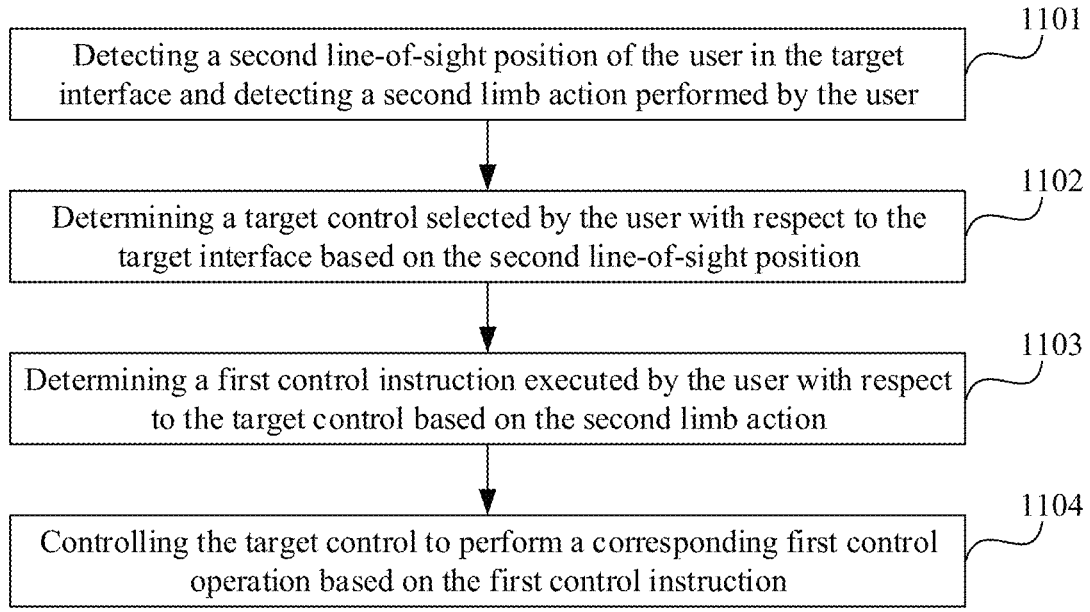
FIG. 11 is yet another flowchart of an interface display method provided by embodiments of the present disclosure.

As shown in FIG. 11, yet another flowchart of an interface display method provided by an embodiment of the present disclosure, differing from the preceding embodiment in that after displaying the target interface associated with the first line-of-sight position, further including:

1101: detecting a second line-of-sight position of the user in the target interface and detecting a second limb action performed by the user.

Optionally, the second line-of-sight position and the first line-of-sight position are detected in the same way, and the way of acquiring the second line-of-sight position and its meaning may be referred to the relevant content of the first line-of-sight position, which will not be repeated herein.

Optionally, the second limb action performed by the user may be recognized by the latest target image. Or, the second limb action performed by the user may be recognized by limb movement data collected by the wearable device.

1102: determining a target control selected by the user with respect to the target interface based on the second line-of-sight position.

Optionally, before executing step 1102, the method may further include:

determining that the second line-of-sight position is located within an interface range of the target interface. That is, when it is determined that the second line-of-sight position is located within the interface range of the target interface, step 1102 is executed, otherwise the execution of step 1101 continues.

Optionally, step 1102 may include: determining a first mapping position of each control in the target interface in the target image, determining a second mapping position of the second line-of-sight position in the target image, mapping the second mapping position with first mapping position of respective control, so as to take the control with successful position-matching as the target control. The position matching may refer to performing a distance calculation between the second mapping position and the first mapping position, and using the control corresponding to the position with the smallest distance as the target control.

1103: determining a first control instruction executed by the user with respect to the target control based on the second limb action.

Optionally, the second limb action may be a defined type of action. The first control instruction may be a control instruction associated with the limb action. The limb action may be represented using an action type name, number, etc. The first control instruction may be control instructions associated with different limb actions, and the limb actions and their associated control instructions may be stored in a database or table. When step 1103 is executed, the first control instruction associated with the second limb action may be queried from the database or the table.

Optionally, the target control may be any control (or widget) in the target interface, for example, the target control may be any one of the map view control, sound control widget, brightness control widget, interface jump widget, music playback widget, image display widget, and the like, and effective control of the target interface can be realized through the selection of the widgets. After determining the target control, the control instruction associated with the target control may be determined. For example, the control instruction associated with the map view control may be a map program start instruction or a viewing instruction, the control instruction associated with the sound control widget may be a sound adjustment instruction, and the control instruction associated with the music playback widget may be a music program start instruction.

1104: controlling the target control to perform a corresponding first control operation based on the first control instruction.

Optionally, the first control instruction may be run to perform the corresponding first control operation with respect to the target control.

Optionally, if the first control instruction is a view instruction of an interface, performing the first control operation may be to start the interface associated with the first control instruction and output the interface associated with the first control instruction. If the first control instruction is a start instruction of a program, performing the first control operation may be to start the corresponding program and display the corresponding program interface.

In embodiments of the present disclosure, after displaying the target interface, a second line-of-sight position of the user with respect to the target interface and a second limb action performed by the user may be detected, the second line-of-sight position may be used to determine a target control selected by the user in the target interface, and the second limb action may be used to determine a first control instruction performed with respect to the target control. That is, the interface control operation is performed on the target interface by means of the line-of-sight position detection and the limb action detection to realize a fast and accurate interface operation on the target interface, and to improve the efficiency and accuracy of the interface operation.

Further, based on any of the above embodiments, the second limb action includes: a target gesture and a movement trajectory executed to maintain the target gesture.

Determining a first control instruction executed by the user with respect to the target control based on the second limb action, includes:

determining a type of gesture control triggered by the user with respect to the target control based on the target gesture in the second limb action;

determining a first control instruction executed by the user with respect to the target control based on the movement trajectory in the second limb action and the type of gesture control.

In embodiments of the present disclosure, the type of gesture control triggered by the user with respect to the target control may be determined based on the target gesture in the second limb action, and the type of gesture control may be indicative of a type of interface control performed on the interface. The gesture may be analyzed at a dynamic level by the movement trajectory in the second limb action, and the gesture may be analyzed at a static level by the type of gesture control. The analyses from both the static and dynamic levels can obtain the first control instruction executed by the user with respect to the target control, improving the efficiency and accuracy of obtaining the first control instruction.

Further, on the basis of any of the above embodiments, the movement trajectory includes a sliding route and a sliding direction of the target gesture.

Determining a first control instruction executed by the user with respect to the target control based on the movement trajectory in the second limb action and the type of gesture control, includes:

determining an adjustment amount and an adjustment type corresponding to the type of gesture control based on the sliding route and sliding direction in the second limb action;

determining the first control instruction based on the adjustment amount, the amount type and the type of gesture control.

The sliding route may include a sliding distance and a curve shape of the sliding route.

In the embodiments of the present disclosure, the movement trajectory includes a sliding route and a sliding direction of the target gesture, the adjustment amount and the adjustment type corresponding to the type of gesture control may be determined, the adjustment amount and the adjustment type may indicate a specific action of the type of gesture control, the accurate definition of the gesture control instruction is achieved through the adjustment amount, the adjustment type and the type of gesture control as a whole, and the obtained first control instruction corresponding to the adjustment amount, the adjustment type and the type of gesture control can be determined with higher precision and can control the target control more accurately.

Further, on the basis of any of the above embodiments, detecting a second limb action performed by the user, includes:

acquiring a latest collected user posture image of the virtual terminal device;

recognizing a second limb action performed by the user from the latest collected user posture image; or acquiring second posture data collected by a posture acquisition device to recognize the second limb action performed by the user based on the second posture data, the posture acquisition device being associated with the virtual terminal device.

Optionally, the virtual terminal device may be provided with a camera that continuously collects a user posture image located in front of the camera, and the user posture image may be continuously collected and continuously displayed as a target image. Of course, the target image may also include other images, such as a virtual image or a three-dimensional virtual image, and at this time, the user posture image may be displayed in the display subregion set in the display interface of the target image. For example, assuming that the target image is a three-dimensional virtual image, and assuming that there exists a virtual television or a virtual display screen in the target image that can be viewed by the user, the user posture image may be displayed in the virtual television or the virtual display screen.

In embodiments of the present disclosure, the recognition of limb action may be achieved by the user posture image, or the recognition of limb action may be achieved by posture data. Recognition of limb action by the user posture image achieves detection of limb action from the computer vision direction, and the accurate limb action can be obtained. Recognition of limb action by posture data achieves accurate detection of limb action from the direction of posture solving, and more accurate limb action can be obtained.

The target image may include the latest user posture image collected by the virtual terminal device (i.e., the latest collected user posture image), and the target image may be updated as the user posture image is updated.

Further, optionally, recognizing a second limb action performed by the user from the latest collected user posture image may include: extracting at least one second image frame corresponding to the key limb information, respectively, from the latest user posture image;

recognizing the limb action of the user based on the key limb information corresponding to the at least one second image frame, respectively.

The specific implementation of the second limb action recognition of the present disclosure may be referred to the recognition of the first limb action in the above embodiments, and will not be repeated herein.

In the embodiments of the present disclosure, real-time detection and recognition of the limb action can be performed on the user posture image collected by the virtual terminal device, so as to improve the precision and efficiency of recognition and obtain more accurate limb action.

In addition, a combination of posture data and limb information can be used to recognize the limb action of the user in the limb recognition process, and both the first limb action and the second limb action can be recognized in combination with the posture data and limb information.

Further, optionally, the step of recognizing the limb action, may further include:

extracting at least one image frame from the latest user posture image corresponding to key limb information, respectively;

acquiring user posture data collected by a posture acquisition device, the posture acquisition device being associated with the virtual terminal device;

determining a limb action of the user based on the user posture data and the key limb information corresponding to the at least one image frame, respectively.

In embodiments of the present disclosure, the user posture data collected by the posture acquisition device may also be acquired, and the limb action may be analyzed by means of two kinds of information, namely, the user posture data and the key limb information corresponding to the at least one target image frame, respectively, expanding the surface of the data analysis, increasing the content of the analysis of the limb action, and improving the accuracy of the analysis of the limb action.

Optionally, on the basis of any of the above embodiments, after displaying the target interface associated with the first line-of-sight position of the target image, the method further includes:

detecting a second line-of-sight position of the user in the target interface and collecting a speech control signal from the user;

determining a line-of-sight-triggered control selected by the user with respect to the target interface based on the second line-of-sight position;

recognizing a second control instruction executed by the user with respect to the line-of-sight-triggered control from the speech control signal;

performing a corresponding second control operation on the line-of-sight-triggered control based on the second control instruction.

Optionally, recognizing a second control instruction executed by the user with respect to the line-of-sight-triggered control from the speech control signal may include: recognizing, through a speech recognition algorithm, a speech control text of the speech control signal, and extracting a command name from the speech control text to obtain the second control instruction corresponding to the command name.

In embodiments of the present disclosure, after displaying the target interface, a second line-of-sight position of the user and the speech control signal may also be detected. The user's line-of-sight-triggered control can be determined by the second line-of-sight position to obtain the line-of-sight trigger control. The second control instruction may also be recognized by the speech control signal. The combination of line-of-sight triggering and speech control is used to realize detailed control of the displayed target interface and to improve the control accuracy and efficiency of the interface.

Optionally, on the basis of any of the above embodiments, after displaying the target interface associated with the first line-of-sight position of the target image, the method further includes:

receiving a speech operation signal initiated with respect to the target interface;

recognizing a third control instruction executed by the user with respect to the target interface from the speech operation signal, the third control instruction including a speech-triggered control being controlled;

performing a corresponding third control operation on the speech-triggered control based on the third control instruction.

Optionally, a speech operation text corresponding to the speech operation signal may be recognized by a speech recognition algorithm, and a control name may be recognized from the speech operation text to obtain a speech-triggered control corresponding to the control name. In addition, an instruction name may be recognized from the speech operation text to obtain a third control instruction corresponding to the instruction name. Of course, in a possible design, the speech operation text may include a control name and an instruction name. For example, the speech operation text may include "perform operation B on control A" where A is the control name and B is the instruction name. In another possible design, the speech operation text may include the instruction name but not the control name, and in this case, the corresponding speech operation control may be determined according to the type of instruction corresponding to the third control instruction. For example, the speech operation text corresponding to the speech operation signal may be "increase sound", and it may be determined that the third operation instruction is to perform a command of increasing sound to a sound control widget, and the speech-triggered control may be a sound control widget.

In the embodiment of the present disclosure, after displaying the target interface, the speech operation signal may be directly acquired. A third control instruction executed by the user for the controlled control in the target interface is recognized from the speech operation signal. Then, based on the third control instruction, a corresponding third control operation is performed on the speech-triggered control in the target interface. The selection of controls and the control of widgets for the target interface is performed directly by the speech control method, and fast and accurate control of the target interface is achieved.

Further, on the basis of any of the above embodiments, after displaying the target interface associated with the first line-of-sight position of the target image, the method further includes:

in the case that an interface closing action is determined to be detected, closing the target interface.

Optionally, the interface closing action may include performing a trigger action on the closing control of the interface. The interface closing action may also include a predefined action, which may include, a hand-executed interface closing action or an eye-executed interface closing action, the hand-executed interface closing action may include, for example, a crossing action of two fingers, and the eye-executed interface closing action may include, for example, blinking twice during a target time period.

In the embodiment of the present disclosure, after detecting the interface closing action, the target interface may be closed to achieve fast and accurate control of the target interface.

Figure 12:
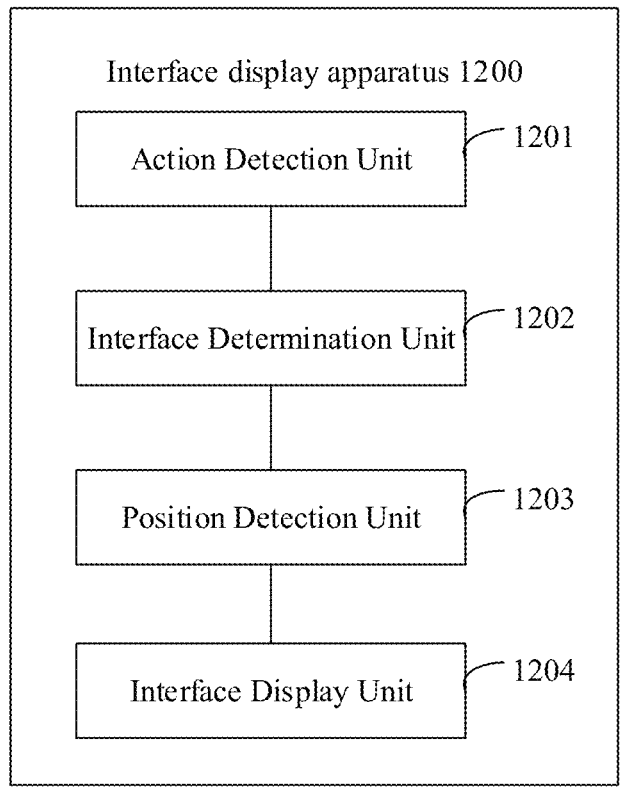
FIG. 12 is a structural schematic diagram of an interface display apparatus provided by embodiments of the present disclosure.

As shown in FIG. 12, a structural schematic diagram of an interface display apparatus provided by embodiments of the present disclosure, the interface display apparatus 1200 may include the following units:

an action detection unit 1201, configured to detect an interface triggering action during a process of displaying a target image by a virtual terminal device;

an interface determination unit 1202, configured to determine a target interface to be displayed in response to the interface triggering action;

a position detection unit 1203, configured to detect a first line-of-sight position corresponding to a line-of-sight of a user in the target image; and an interface display unit 1204, configured to display the target interface associated with the first line-of-sight position of the target image.

Further, on the basis of any of the above embodiments, the interface display unit 1204 includes:

an action detection module, configured to determine a first limb action performed by the user; and an interface determination module, configured to determine an interface associated with the first limb action as the target interface to be displayed.

Further, on the basis of any of the above embodiments, the action detection module includes:

an image acquisition submodule, configured to acquire a user posture image currently collected by the virtual terminal device;

an action recognition submodule, configured to recognize a first limb action performed by the user from the user posture image; or a posture analysis submodule, configured to acquire first posture data collected by a posture acquisition device to recognize the first limb action performed by the user based on the first posture data, and the posture acquisition device is associated with the virtual terminal device.

Further, on the basis of any of the above embodiments, the first limb action comprises a target hand action or a target eye action, the interface determination module includes:

an action association submodule, configured to determine an interface associated with the target hand action or the target eye action as the target interface that needs to be displayed.

Further, on the basis of any of the above embodiments, the interface display apparatus further includes:

a secondary detection unit, configured to detect a second line-of-sight position of the user in the target interface and detect a second limb action performed by the user.

a control selection unit, configured to determine a target control selected by the user with respect to the target interface based on the second line-of-sight position;

an instruction determination unit, configured to determine a first control instruction executed by the user with respect to the target control based on the second limb action; and a first operation unit, configured to control the target control to perform a corresponding first control operation based on the first control instruction.

Further, on the basis of any of the above embodiments, the second limb action includes a target gesture and a movement trajectory executed to maintain the target gesture, and the instruction determination unit further includes:

a gesture analysis module, configured to determine a type of gesture control triggered by the user with respect to the target control based on the target gesture in the second limb action; and an instruction determination module, configured to determine the first control instruction executed by the user with respect to the target control, based on the movement trajectory in the second limb action and the type of gesture control.

Further, on the basis of any of the above embodiments, the movement trajectory includes a sliding route of the target gesture and a sliding direction of the target gesture, and the instruction determination module includes:

an adjustment determination submodule, configured to determine an adjustment amount and an adjustment type corresponding to the type of gesture control based on the sliding route and sliding direction in the second limb action; and an instruction determination submodule, configured to determine the first control instruction based on the adjustment amount, the adjustment type and the type of gesture control.

Further, on the basis of any of the above embodiments, the secondary detection unit includes:

an image acquisition module, configured to acquire a latest user posture image collected by the virtual terminal device;

an action recognition module, configured to recognize a second limb action performed by the user from the latest user posture image; or an posture analysis module, configured to acquire second posture data collected by a posture acquisition device to recognize the second limb action performed by the user based on the second posture data, and the posture acquisition device is associated with the virtual terminal device.

Further, on the basis of any of the above embodiments, the interface display apparatus further includes:

a first detection unit, configured to detect a second line-of-sight position of the user in the target interface and collect a speech control signal from the user;

a line-of-sight detection unit, configured to determine a line-of-sight-triggered control selected by the user with respect to the target interface based on the second line-of-sight position;

a first recognition unit, configured to recognize a second control instruction executed by the user with respect to the line-of-sight-triggered control from the speech control signal; and an instruction analysis unit, configured to perform a corresponding second control operation on the line-of-sight-triggered control based on the second control instruction.

Further, on the basis of any of the above embodiments, the interface display apparatus further includes:

a signal receiving unit, configured to receive a speech operation signal initiated with respect to the target interface;

a second recognition unit, configured to recognize a third control instruction executed by the user with respect to the target interface from the speech operation signal, and the third control instruction includes a speech-triggered control being controlled; and an instruction control unit, configured to perform a corresponding third control operation on the speech-triggered control based on the third control instruction.

Further, on the basis of any of the above embodiments, the interface display apparatus further includes:

an interface closing unit, configured to close the target interface when an interface action is determined to be detected.

The apparatus provided in the present embodiment may be used to perform the technical solutions of the above method embodiments, which are similar in terms of realization principles and technical effects, and the present embodiment will not be repeated herein.

In order to realize the above embodiment, the embodiment of the present disclosure also provides an electronic device.

Figure 13:
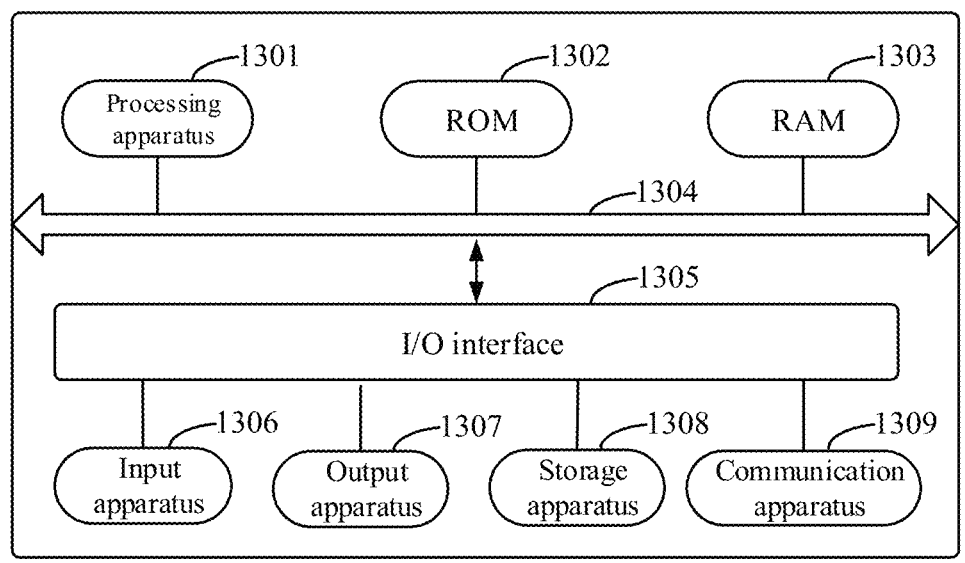
FIG. 13 is a schematic diagram of a hardware structure of an electronic device provided by embodiments of the present disclosure.

Referring to FIG. 13, FIG. 13 illustrates a schematic structural diagram of an electronic device 1300 suitable for implementing embodiment of the present disclosure, the electronic device 1300 may be a terminal device or a server. The electronic device in embodiments of the present disclosure may include but is not limited to a mobile terminal such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and a fixed terminal such as a digital TV, a desktop computer, or the like. The electronic device illustrated in FIG. 13 is merely an example, and should not pose any limitation to the functions and the range of use of embodiments of the present disclosure.

As illustrated in FIG. 13, the electronic device 1300 may include a processing apparatus 1301 (e.g., a central processing unit, a graphics processing unit, etc.), which can perform various suitable actions and processing according to a program stored in a read-only memory (ROM) 1302 or a program loaded from a storage apparatus 1308 into a random-access memory (RAM) 1303. The RAM 1303 further stores various programs and data required for the operation of the electronic device 1300. The processing apparatus 1301, the ROM 1302, and the RAM 1303 are interconnected by means of a bus 1304. An input/output (I/O) interface 1305 is also connected to the bus 1304.

Usually, the following apparatus may be connected to the I/O interface 1305: an input apparatus 1306 including, for example, a touch screen, a touch pad, a keyboard, a mouse, a camera, a microphone, an accelerometer, a gyroscope, or the like; an output apparatus 1307 including, for example, a liquid crystal display (LCD), a loudspeaker, a vibrator, or the like; a storage apparatus 1308 including, for example, a magnetic tape, a hard disk, or the like; and a communication apparatus 1309. The communication apparatus 1309 may allow the electronic device 1300 to be in wireless or wired communication with other devices to exchange data. While FIG. 13 illustrates the electronic device 1300 having various apparatuses, it should be understood that not all of the illustrated apparatuses are necessarily implemented or included. More or fewer apparatuses may be implemented or included alternatively.

Particularly, according to embodiments of the present disclosure, the processes described above with reference to the flowcharts may be implemented as a computer software program. For example, embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 1309 and installed, or may be installed from the storage apparatus 1308, or may be installed from the ROM 1302. When the computer program is executed by the processing apparatus 1301, the above-mentioned functions defined in the methods of embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to execute the method shown in the above-described embodiment.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

A first aspect, according to one or more embodiments of the present disclosure, an interface display method is provided, and the interface display method includes:
  detecting an interface triggering action during a process of displaying a target image by a virtual terminal device;
  in response to the interface triggering action, determining a target interface to be displayed;
  detecting a first line-of-sight position corresponding to a line-of-sight of a user in the target image;
  displaying the target interface associated with the first line-of-sight position of the target image.

According to one or more embodiments of the present disclosure, determining a target interface that needs to be displayed, includes:
  determining a first limb action performed by the user;
  determining an interface associated with the first limb action as the target interface to be displayed.

According to one or more embodiments of the present disclosure, determining a first limb action performed by the user, includes:
- acquiring a currently collected user posture image from the virtual terminal device;
- recognizing the first limb action performed by the user from the currently collected user posture image; or
- acquiring first posture data collected by a posture acquisition device to recognize the first limb action performed by the user based on the first posture data, and the posture acquisition device is associated with the virtual terminal device.

According to one or more embodiments of the present disclosure, the first limb action includes a target hand action or a target eye action;
- determining an interface associated with the first limb action as the target interface to be displayed, includes:
- determining an interface associated with the target hand action or the target eye action as the target interface to be displayed.

According to one or more embodiments of the present disclosure, after displaying the target interface associated with the first line-of-sight position of the target image, the method further includes:
- detecting a second line-of-sight position of the user in the target interface and detecting a second limb action performed by the user;
- determining a target control selected by the user with respect to the target interface based on the second line-of-sight position;
- determining a first control instruction executed by the user with respect to the target control based on the second limb action;
- controlling the target control to perform a corresponding first control operation based on the first control instruction.

According to one or more embodiments of the present disclosure, the second limb action includes a target gesture and a movement trajectory executed to maintain the target gesture;
- determining a first control instruction executed by the user with respect to the target control based on the second limb action, includes:
- determining a type of gesture control triggered by the user with respect to the target control based on the target gesture in the second limb action;
- determining the first control instruction executed by the user with respect to the target control, based on the movement trajectory in the second limb action and the type of gesture control.

According to one or more embodiments of the present disclosure, the movement trajectory includes a sliding route of the target gesture and a sliding direction of the target gesture;
- determining a first control instruction executed by the user with respect to the target control based on the movement trajectory in the second limb action and the type of gesture control, includes:
- determining an adjustment amount and an adjustment type corresponding to the type of gesture control based on the sliding route and sliding direction in the second limb action;
- determining the first control instruction based on the adjustment amount, the adjustment type and the type of gesture control.

According to one or more embodiments of the present disclosure, detecting a second limb action performed by the user, includes:
- acquiring a user posture image newly collected by the virtual terminal device;
- recognizing a second limb action performed by the user from the newly collected user posture image; or
- acquiring second posture data collected by a posture acquisition device to recognize the second limb action performed by the user based on the second posture data, and the posture acquisition device is associated with the virtual terminal device.

According to one or more embodiments of the present disclosure, after displaying the target interface at the first line-of-sight position of the target image, the method further includes:
- detecting a second line-of-sight position of the user in the target interface and collecting a speech control signal of the user;
- determining a line-of-sight-triggered control selected by the user with respect to the target interface based on the second line-of-sight position;
- recognizing a second control instruction executed by the user with respect to the line-of-sight-triggered control from the speech control signal; and
- performing a corresponding second control operation on the line-of-sight-triggered control based on the second control instruction.

According to one or more embodiments of the present disclosure, after displaying the target interface at the first line-of-sight position of the target image, the method further includes:
- receiving a speech operation signal initiated with respect to the target interface;
- recognizing a third control instruction executed by the user with respect to the target interface from the speech operation signal, and the third control instruction includes a speech-triggered control being controlled; and
- performing a corresponding third control operation on the speech-triggered control based on the third control instruction.

According to one or more embodiments of the present disclosure, after displaying the target interface at the first line-of-sight position of the target image, the method further comprises:
- in a case that an interface closing action is determined to be detected, closing the target interface.

A second aspect, according to one or more embodiments of the present disclosure, an interface display apparatus is provided, the interface display apparatus includes:
- an action detection unit, configured to detect an interface triggering action during a process of displaying a target image by a virtual terminal device;
- an interface determination unit, configured to determine a target interface that needs to be displayed in response to the interface triggering action;
- a position detection unit, configured to detect a first line-of-sight position corresponding to a line-of-sight of a user in the target image; and
- an interface display unit, configured to associated display the target interface at the first line-of-sight position of the target image.

A third aspect, according to one or more embodiments of the present disclosure, an electronic device is provided, the electronic device includes:

at least one processor and a memory, and the memory stores computer execution instructions, the at least one processor executes the computer-executed instructions stored in the memory, causing the processor implements the interface display method according to the above first aspect and various possible designs of the first aspect.

A fourth aspect, according to one or more embodiments of the present disclosure, a non-transitory computer-readable storage medium is provided, the non-transitory computer-readable storage medium stores computer-executable instructions, upon the processor executing the computer-executable instructions, the interface display method according to the above first aspect and various possible designs of the first aspect.

A fifth aspect, according to one or more embodiments of the present disclosure, a computer program product is provided, the computer program product includes a computer program which, when executed by a processor, realizes the interface display method of the first aspect and various possible designs as described above.

The above description is only the preferred embodiment of the present disclosure and the explanation of the applied technical principles. It should be understood by those skilled in the art that the disclosure scope involved in this disclosure is not limited to the technical scheme formed by the specific combination of the above technical features, but also covers other technical schemes formed by any combination of the above technical features or their equivalent features without departing from the above disclosure concept. For example, the above features are replaced with (but not limited to) technical features with similar functions disclosed in this disclosure.

Furthermore, although the operations are depicted in a particular order, this should not be understood as requiring that these operations be performed in the particular order shown or in a sequential order. Multi-tasking and parallel processing may be beneficial under certain user postures. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although the subject matter has been described in language specific to structural features and/or methodological logical acts, it should be understood that the subject matter defined in the appended claims is not necessarily limited to the specific features or acts described above. On the contrary, the specific features and acts described above are only exemplary forms of implementing the claims.

The invention claimed is:

1. An interface display method, comprising:
   detecting an interface triggering action during a process of displaying a target image by a virtual terminal device;
   in response to the interface triggering action, determining a target interface that needs to be displayed;
   detecting a first line-of-sight position corresponding to a line-of-sight of a user in the target image;
   displaying the target interface at the first line-of-sight position of the target image;
   wherein the interface display method further comprises:
   detecting a second line-of-sight position of the user in the target interface and detecting a first limb action performed by the user;
   determining a target control selected by the user with respect to the target interface based on the second line-of-sight position;
   determining a first control instruction executed by the user with respect to the target control based on the first limb action; and
   controlling the target control to perform a corresponding first control operation based on the first control instruction.

2. The interface display method according to claim 1, wherein the determining a target interface that needs to be displayed, comprises:
   determining a second limb action performed by the user; and
   determining an interface associated with the second limb action as the target interface that needs to be displayed.

3. The interface display method according to claim 2, wherein the determining a second limb action performed by the user, comprises:
   acquiring a user posture image currently collected by the virtual terminal device;
   recognizing the second limb action performed by the user from the user posture image.

4. The interface display method according to claim 2, wherein the determining a second limb action performed by the user, comprises:
   acquiring first posture data collected by a posture acquisition device to recognize the second limb action performed by the user based on the first posture data, wherein the posture acquisition device is associated with the virtual terminal device.

5. The interface display method according to claim 2, wherein the second limb action comprises a target hand action or a target eye action;
   the determining an interface associated with the second limb action as the target interface that needs to be displayed, comprises:
   determining an interface associated with the target hand action or the target eye action as the target interface that needs to be displayed.

6. The interface display method according to claim 1, wherein the first limb action comprises: a target gesture and a movement trajectory executed to maintain the target gesture;
   the determining a first control instruction executed by the user with respect to the target control based on the first limb action, comprises:
   determining a type of gesture control triggered by the user with respect to the target control based on the target gesture in the first limb action;
   determining the first control instruction executed by the user with respect to the target control, based on the movement trajectory in the first limb action and the type of gesture control.

7. The interface display method according to claim 6, wherein the movement trajectory comprises a sliding route and a sliding direction of the target gesture;
   the determining a first control instruction executed by the user with respect to the target control based on the movement trajectory in the first limb action and the type of gesture control, comprises:
   determining an adjustment amount and an adjustment type corresponding to the type of gesture control based on the sliding route and sliding direction in the first limb action;

determining the first control instruction based on the adjustment amount, the adjustment type and the type of gesture control.

8. The interface display method according to claim 1, wherein the detecting a first limb action performed by the user comprises:
acquiring a latest user posture image collected by the virtual terminal device;
recognizing a first limb action performed by the user from the latest user posture image.

9. The interface display method according to claim 1, wherein the detecting a first limb action performed by the user comprises:
acquiring posture data collected by a posture acquisition device to recognize the first limb action performed by the user based on the posture data, wherein the posture acquisition device is associated with the virtual terminal device.

10. The interface display method according to claim 1, further comprising:
detecting a third line-of-sight position of the user in the target interface and collecting a speech control signal of the user;
determining a line-of-sight-triggered control selected by the user with respect to the target interface based on the third line-of-sight position;
recognizing a second control instruction executed by the user with respect to the line-of-sight-triggered control from the speech control signal; and
performing a corresponding second control operation on the line-of-sight-triggered control based on the second control instruction.

11. The interface display method according to claim 1, further comprising:
receiving a speech operation signal initiated with respect to the target interface;
recognizing a second control instruction executed by the user with respect to the target interface from the speech operation signal, wherein the second control instruction comprises a speech-triggered control being controlled; and
performing a corresponding second control operation on the speech-triggered control based on the second control instruction.

12. The interface display method according to claim 1, further comprising:
in a case that an interface closing action is determined to be detected, closing the target interface.

13. An electronic device, comprising:
one or more processors;
a non-transitory memory;
one or more programs stored in the non-transitory memory, which, when executed by the one or more processors, cause the electronic device to:
detect an interface triggering action during a process of displaying a target image by a virtual terminal device;
in response to the interface triggering action, determine a target interface to be displayed;
detect a first line-of-sight position corresponding to a line-of-sight of a user in the target image;
display the target interface at the first line-of-sight position of the target image;
wherein the one or more programs, when executed by the one or more processors, further cause the electronic device to:
detect a second line-of-sight position of the user in the target interface and detecting a first limb action performed by the user;
determine a target control selected by the user with respect to the target interface based on the second line-of-sight position;
determine a first control instruction executed by the user with respect to the target control based on the first limb action; and
control the target control to perform a corresponding first control operation based on the first control instruction.

14. The electronic device according to claim 13, wherein the one or more programs, when executed by the one or more processors, further cause the electronic device to:
determine a second limb action performed by the user; and
determine an interface associated with the second limb action as the target interface to be displayed.

15. The electronic device according to claim 14, wherein the second limb action comprises a target hand action or a target eye action;
wherein the one or more programs, when executed by the one or more processors, further cause the electronic device to:
determine an interface associated with the target hand action or the target eye action as the target interface to be displayed.

16. The electronic device according to claim 13, wherein the one or more programs, when executed by the one or more processors, further cause the electronic device to:
detect a third line-of-sight position of the user in the target interface and collecting a speech control signal of the user;
determine a line-of-sight-triggered control selected by the user with respect to the target interface based on the third line-of-sight position;
recognize a second control instruction executed by the user with respect to the line-of-sight-triggered control from the speech control signal; and
perform a corresponding second control operation on the line-of-sight-triggered control based on the second control instruction.

17. The electronic device according to claim 13, wherein the one or more programs, when executed by the one or more processors, further cause the electronic device to:
receive a speech operation signal initiated with respect to the target interface;
recognize a second control instruction executed by the user with respect to the target interface from the speech operation signal, wherein the second control instruction comprises a speech-triggered control being controlled; and
perform a corresponding second control operation on the speech-triggered control based on the second control instruction.

18. A non-transitory computer-readable storage medium, wherein the non-transitory computer-readable storage medium stores computer-executable instructions which, upon exaction by at least one processor, cause the at least one processor to implement operations comprising:
detecting an interface triggering action during a process of displaying a target image by a virtual terminal device;
in response to the interface triggering action, determining a target interface to be displayed;
detecting a first line-of-sight position corresponding to a line-of-sight of a user in the target image;

displaying the target interface at the first line-of-sight position of the target image;
wherein the operations further comprise:
detecting a second line-of-sight position of the user in the target interface and detecting a first limb action performed by the user;
determining a target control selected by the user with respect to the target interface based on the second line-of-sight position;
determining a first control instruction executed by the user with respect to the target control based on the first limb action; and
controlling the target control to perform a corresponding first control operation based on the first control instruction.

19. The non-transitory computer-readable storage medium according to claim 18,
wherein the first limb action comprises a target gesture and a movement trajectory executed to maintain the target gesture; and wherein the determining a first control instruction executed by the user with respect to the target control based on the first limb action comprises:
determining a type of gesture control triggered by the user with respect to the target control based on the target gesture in the first limb action, and
determining the first control instruction executed by the user with respect to the target control based on the movement trajectory in the first limb action and the type of gesture control.

20. The non-transitory computer-readable storage medium according to claim 18, wherein the detecting a first limb action performed by the user comprises:
acquiring a latest user posture image collected by the virtual terminal device; and
recognizing a first limb action performed by the user from the latest user posture image.

* * * * *